United States Patent
Rotondaro et al.

(10) Patent No.: US 10,276,999 B1
(45) Date of Patent: Apr. 30, 2019

(54) FLOWING GAS, LASER PUMPED, ALKALI METAL LASER WITH THERMAL CONFINEMENT OF ALKALI METAL

(71) Applicant: The United States of America, as represented by the Secretary of the Air Force, Washington, DC (US)

(72) Inventors: Matthew D. Rotondaro, Colorado Springs, CO (US); Randal J. Knize, Colorado Springs, CO (US); Boris Zhdanov, Colorado Springs, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/873,612

(22) Filed: Jan. 17, 2018

(51) Int. Cl.
*H01S 3/03* (2006.01)
*H01S 3/034* (2006.01)
(Continued)

(52) U.S. Cl.
CPC ............ *H01S 3/031* (2013.01); *H01S 3/0346* (2013.01); *H01S 3/041* (2013.01); *H01S 3/227* (2013.01); *H01S 3/094* (2013.01)

(58) Field of Classification Search
CPC ........ H01S 3/031; H01S 3/227; H01S 3/0346; H01S 3/041; H01S 3/0915–0933; H01S 3/094; H01S 3/0943
See application file for complete search history.

(56) References Cited

U.S. PATENT DOCUMENTS

| 4,151,486 A * | 4/1979 | Itzkan ............... H01S 3/305 372/3 |
| 4,193,042 A * | 3/1980 | Wang ............... H01S 3/031 372/56 |

(Continued)

FOREIGN PATENT DOCUMENTS

WO   WO-2016063280 A2 *   4/2016   ............... H01S 3/22

OTHER PUBLICATIONS

A.V. Bogachev, S.A. Sukharev et al., Diode-pumped caesium vapour laser with closed-cycle laser-active medium circulation, Quantum Electronics, 42 (2) pp. 95-99 2012 Kvantovaya Elektronika and Turpion Ltd.

(Continued)

*Primary Examiner* — Joshua King
(74) *Attorney, Agent, or Firm* — AFMCLO/JAZ; Chastity Whitaker

(57) ABSTRACT

An optically pumped, flowing gas, alkali metal laser includes a gas passageway transporting an alkali metal vapor and a hydrocarbon buffer gas, and a laser propagation passageway intersects the gas passageway and forms a main cell at the intersection. A pump laser is directed into the main cell and produces a main laser beam in the laser propagation passageway. The flowing hydrocarbon buffer gas is disposed in the main cell with a density to induce spin-orbit relaxation in the alkali metal vapor. At least one window is disposed in the laser propagation passageway, and the window is protected from deposits of alkali metal or carbon by a heated leading edge in the laser propagation passageway that revaporizes alkali metal and returns it to the gas passageway via a convective gas flow. The window is further protected by a cold block that liquefies alkali metal and by a colder block that solidifies alkali metal in the laser propagation passageway.

3 Claims, 2 Drawing Sheets

(51) Int. Cl.
*H01S 3/041* (2006.01)
*H01S 3/094* (2006.01)
*H01S 3/227* (2006.01)

(56) References Cited

U.S. PATENT DOCUMENTS

| | | | | |
|---|---|---|---|---|
| 4,328,464 A | * | 5/1982 | Frosch | H01S 3/031 359/337 |
| 4,504,953 A | * | 3/1985 | Stevens | H01S 3/02 372/56 |
| 4,504,955 A | * | 3/1985 | Macklin | H01J 61/70 313/564 |
| 4,592,064 A | * | 5/1986 | Silfvast | H01S 3/227 372/5 |
| 4,782,493 A | * | 11/1988 | Sabotinov | H01S 3/031 372/103 |
| 4,794,612 A | * | 12/1988 | Fuke | H01S 3/031 372/56 |
| 5,325,391 A | * | 6/1994 | Hall | H01S 3/031 372/56 |
| 5,412,684 A | * | 5/1995 | Schlie | H01S 3/0975 372/56 |
| 5,487,078 A | * | 1/1996 | Rhodes | H01S 4/00 372/39 |
| 5,889,807 A | * | 3/1999 | Cunningham | H01S 3/036 372/55 |
| 6,049,557 A | * | 4/2000 | Cunningham | H01S 3/036 372/59 |
| 2009/0022201 A1 | * | 1/2009 | Krupke | H01S 3/031 372/75 |
| 2014/0133514 A1 | * | 5/2014 | Krupke | H01S 3/031 372/56 |

OTHER PUBLICATIONS

C.R. Vidal and J. Cooper, Heat-Pipe Oven: A new, Well-Defined Metal Vapor Device for Spectroscopic Measurements, Journal of Applied Physics 40, 3370-3374 (1969).

M. Rotondaro, C Wisniewski, M. Post, C. Porter, E.Smith and G. Hager; Determination of Rubidium Number Density under Optically Thick Conditions, Pressure Broadened by Helium and Methane, Journal of Directed Energy, 4, Spring 2011, 168-183.

\* cited by examiner

FLOWING GAS, LASER PUMPED, ALKALI METAL LASER WITH THERMAL CONFINEMENT OF ALKALI METAL

GOVERNMENT INTEREST

The invention described herein may be manufactured and used by or for the Government of the United States for all governmental purposes without the payment of any royalty.

FIELD

The Field of the Invention Is a Flowing Gas Laser and particularly, a Flowing Gas Laser That Is Pumped with a Laser.

BACKGROUND

There has been extensive work developing lasers using pumped gases to provide high-power laser beams. In particular, pumped gas has been used in diode pumped alkali metal lasers in which a flowing gas is provided in a main cell and a diode laser is used to pump the main cell and create a laser beam propagating down a laser propagation passageway. High-power is achievable in this type of laser in part because the flowing gas provides the right concentration and temperature of both the alkali metal vapor and the hydrocarbon gas in the main cell where the laser beam is created. However, the flowing gas by necessity creates a fairly unstable environment within the laser propagation passageway. Eddy currents, convective effects and the like will cause the gas to flow slightly within the laser propagation passageway, which is undesirable. To prevent the gas from contaminating the window of the laser, the typical solution is to shield the window by providing a continuous flow of gas across the window to prevent the alkali metal vapor from reaching the window. If the alkali metal vapor does contact the window, it will deposit on the window and it will begin to absorb the heat of the laser within the laser propagation passageway. The metal on the window will become very hot and will reach a temperature sufficient to break down the hydrocarbon gas. Then, carbon from the hydrocarbon gas will deposit on the window and reduce the transparency of the window. This phenomenon is called window burning, and it will greatly reduce the power and efficiency of the laser.

The process of using a gas flow to protect the window of the laser can be effective, but it creates mechanical complications and expenses associated with supplying and controlling another gas within the laser and it creates potential problems based on the introduction of yet another gas within laser. The present invention proposes a laser in which alkali metal gases and hydrocarbon gases are flowing through a main cell that does not require flowing a protective gas across the laser window.

SUMMARY OF INVENTION

In accordance with one aspect of the present invention, a laser includes a gas passageway that contains and transports a flow of gas containing both a material vapor and a buffer gas. Typically, the buffer gas is a hydrocarbon gas and the material is an alkali metal. The gas passageway intersects with a laser propagation passageway and creates a main cell at the intersection, and a pump source produces a pump laser that is directed into the main cell where it creates a laser beam in the laser propagation passageway. At least one window is provided in the laser propagation passageway, and the laser beam exits the laser propagation passageway through the window. At least one cooled surface is provided between the window and the gas passageway (also the main cell), and the cooled surface has a temperature that is at least sufficiently cold to condense the material vapor and capture the material on the cooled surface thereby protecting the window from contact with the material. The cooled surface may capture the material in either a liquid form or a solid form depending upon the temperature of the surface. In one embodiment, the cooled surface extends in a direction generally parallel to the laser propagation passageway and is configured to wick liquid material towards the gas passageway and the main cell and away from the window.

In accordance with a more particular embodiment, the cooled surfaces may actually be two surfaces, a cold surface and a colder surface. The cold surface has a temperature that condenses the material and captures the material in a liquid form, and the colder surface has a temperature that solidifies the material and captures the material in a solid form. The cold surface is disposed in the laser propagation passageway between the colder surface and the main cell of the laser. The cold and colder surfaces may be tubular surfaces disposed adjacent to the laser propagation passageway. Alternatively, the cold and colder surfaces may be tubular shaped regions of the laser propagation passageway.

In accordance with another aspect of the invention, a heat source is provided that contributes to the retention of the material vapor within the gas passageway. The heat source may be one or more sources of heat and it is disposed for heating the walls of the gas passageway in the region immediately adjacent to the main cell. As the gas flows in the gas passageway towards the main cell, the heat source raises the temperature of the gas to maintain the material in a vapor state. The heat source is also disposed to heat the leading edges of the laser propagation passageway to a temperature sufficient to vaporize the material. A convective gas flow is formed in the laser propagation passageway and such flow is induced by the flow of the gas in the gas passageway adjacent to the laser propagation passageway. This convective gas flow is disposed such that it flows into the leading edges of the laser propagation passageway and at least some of the material in the convective gas flow is heated to the vaporization temperature of the material by the heat of the leading edges. The vaporized or re-vaporized material is then carried by the convective gas flow back to the main cell and the gas passageway. The material in the flowing gas may be and alkali metals such as cesium, rubidium or potassium. The flowing gas may further include a hydrocarbon such as methane or ethane.

In accordance with a more specific embodiment, a laser includes a gas passageway that includes a wall for containing and transporting a flow of gas, and the gas includes alkali metal vapor and further includes a hydrocarbon buffer gas. A laser propagation passageway intersects the gas passageway and forms a main cell at the intersection, and a pump source produces a pump laser that is directed into the main cell and produces a laser beam in the laser propagation passageway. The flowing hydrocarbon buffer gas is disposed in the main cell with a density sufficient to induce spin-orbit relaxation in the alkali metal vapor. At least one window is disposed in the laser propagation passageway, and two cooled blocks are disposed in the laser propagation passageway between the window and the main cell. At least one cold block is disposed to cool the wall of the gas passageway and produce a cold wall region between the window and the main cell. The cold wall region is cooled to a temperature sufficient to condense the alkali metal vapor to produce a liquid alkali metal on the cold wall region. The cold wall region is also configured to wick the liquid alkali metal back toward the main cell. At least one colder block is disposed to cool the wall of the gas passageway and produce a colder wall region between the window and the cold wall region. The colder wall region is cooled to a temperature that is sufficiently cold to solidify the alkali metal vapor in the gas and to capture the alkali metal in a solid form on the colder wall region whereby the window is protected from the alkali metal in the gas by the removal of the alkali metal from the gas by the cold wall region and the colder wall region. The cold block and the colder blocks are also configured to protect the window from the heat of the laser propagation passageway and maintain the window at room temperature. The windows may include antireflective coating or may be mounted at Brewster's angle. This embodiment may also include the heat source and the heated leading edges in the laser propagation passageway as described above.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
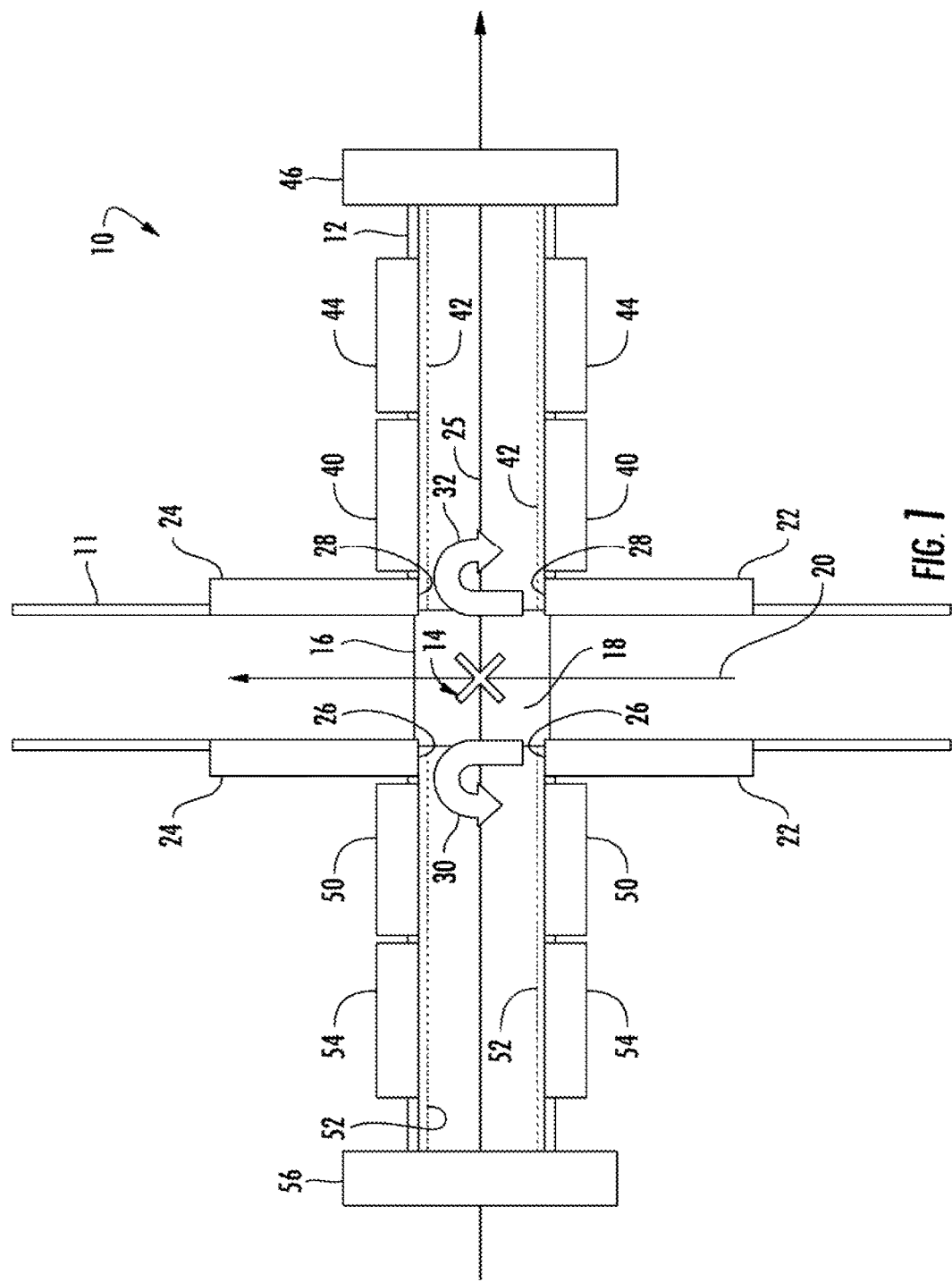
FIG. 1 is a schematic diagram of a six cross (three axes) gas pumped, laser pumped, alkali metal laser.

Referring to the drawings in which like reference characters refer to like or corresponding parts throughout the several views, a schematic diagram is shown in FIG. 1 depicting the internal workings of a gas pumped, diode laser pumped, alkali metal laser 10, which may be referred to as a six-way cross laser because it has three passageways disposed along three axes that cross. The passageways include a gas passageway 11 which is shown in the vertical direction in FIG. 1, and a laser propagation passageway 12 which is shown in the horizontal direction. A laser pump passageway 16 extends perpendicularly to both the gas passageway 11 and the laser propagation passageway 12 and thus extends out of the page. A pumping laser beam 14 is indicated by the "X" identified by the number 14. In the schematic diagram the "x" 14 also represents a pumping laser, such as a diode laser, and a pumping laser passageway that intersects the main cell 18. The intersection of the three passageways forms a cube which is referred to herein as the main cell 18, and a main laser beam 25 is produced within the main cell 18 and is propagated down the laser propagation passageway 12.

The gas flow 20 in the gas passageway 11 includes a lazing material and a buffer gas which is preferably hydrocarbon gas but can be a mixture of hydrocarbon and noble gas. The lazing material is preferably an alkali metal vapor such as potassium, rubidium or cesium and the hydrocarbon gas is preferably methane or ethane. The alkali metal vapor is provided in a concentration designed to maximize the power and efficiency of the laser, and the hydrocarbon gas is provided at a concentration designed to efficiently transport the alkali metal vapor and to induce spin-orbit relaxation. For example, the gas flow 20 may include cesium vapor having a number density of $1\times10^{12}$ to $1\times10^{14}$ particles of Cesium per cubic centimeter and methane having a total pressure of 25 to 2000 Torr. The gas flow 20 may flow with a translational velocity of 1 to 300 meters per second in the direction transverse to the pump and laser axis. The cesium vapor density and methane pressure are selected to provide an optimum concentration of the cesium vapor for producing an optimally efficient production of the main laser beam 25.

A heat block 22 is provided adjacent the gas passageway 20 immediately upstream from the main cell 18. The gas flow 20 is heated by heat block 22 as it approaches the main cell 18 and it helps maintain the gas flow 20 at a proper temperature for producing a laser within the main cell 18. In particular, the temperature of the gas flow 20 should be sufficient to maintain the alkali metal in a vapor state. As the gas flow 20 passes through the main cell 18, it is optically pumped by the pump laser beam 14 which may be provided by a diode laser. The pump laser beam 14 pumps a main laser beam 25 that is created in the main cell 18 and is transmitted through the laser propagation passageway 12. After the gas flow 20 exits the main cell 18 it passes heater blocks 24 that continue to heat the gas flow 20 and thereby maintains a desired temperature. The gas flow 20 may be created continuously by fresh gas, but in most embodiments, it is reconditioned and recirculated. The heater block 22 is shown in cross-section in FIG. 1 and appears as two blocks, but in actual construction, block 22 may be a single block or multiple blocks that completely surround the gas passageway 11 and provide uniform heat along the walls of the gas passageway 11. Likewise, the heater block 24 may be a single block or multiple blocks that encircle the gas passageway and again provide uniform heat along the walls of the gas passageway 11.

The heater blocks 22 and 24 are disposed adjacent the laser propagation passageway 12 and create heated leading edges 26 and 28 within the laser propagation passageway 12 immediately adjacent to the main cell 18. The heater blocks 22 and 24 may just heat the top and bottom sides of the passageway 12, but alternatively, the heater blocks 22 and 24 may surround the laser propagation passageway 12 such that a continuous tubular heated surface is formed within the laser propagation passageway 12. In such case, the two leading edges 26 as shown in FIG. 1 would represent a continuous tubular heated leading edge within the laser propagation passageway 12. Likewise, the two leading edges 28 shown in FIG. 1 would represent a continuous tubular heated leading edge within the passageway 12.

The gas flow 20 naturally induces convective gas flows 30 and 32 within the laser propagation passageway 12 immediately adjacent to the main cell 18. These convective gas flows 30 and 32 strike the leading edges 26 and 28 which further heats the gas and will vaporize any alkali metal that has condensed within those gas flows 30 and 32. The leading edges 26 and 28 are heated to a temperature of the 130° centigrade for cesium, 160 degrees centigrade for rubidium, and 200° C. for potassium. These temperatures are sufficient to vaporize the associated alkali metal as identified above. The circulating flow of the gas flows 30 and 32 will also naturally return the vaporized alkali metal to the main cell 18 and the alkali metal vapor will thus be reintroduced to the gas flow 20 and at least some of the reintroduced metal vapor will exit the main cell 18 with the gas flow 20.

Referring to the right side of the laser propagation passageway 12, a cold block 40 is positioned adjacent to the leading edge 28, and the cold block 40 is cooled to maintain a temperature sufficient to condense the alkali metal vapor and form a vapor on a wicking surface 42 within the passageway 12. The convective flow 32 will also cause the gas, including the alkali metal vapor, to engage the wicking surface 42 adjacent the cold block 40, and the alkali metal within the gas will be deposited on the wicking surface 42 as it condenses. The alkali metal liquid will move along the wicking surface 42 toward the heated leading edge 28 where the alkali metal will be re-vaporized and again caught up in the convective gas flow 32. At least some of the re-vaporized alkali metal will be returned to the gas flow 20 by the convective gas flow 32 and will eventually exit the main cell 18 within the gas flow 20. The re-vaporization of the liquid metal on the wicking surface by the heated leading edge 28 will accelerate the movement of the liquid metal on the wicking surface 42 toward the leading edge 28. In effect, the leading edge 28 will pull the liquid metal on the wicking surface 42 toward the leading edge 28.

Positioned to the right of the cold block 40 is a colder block 44 which is cooled to a temperature sufficient to solidify the alkali metal in the gas within the passageway 12. The convective gas flows 32 within the passageway 12 are significantly reduced, but still exist in the vicinity of the cold block 44. As the gas impinges upon the surface of the passageway 12 (which is also the wicking surface 42) that is cooled by the block 44, the alkali metal is captured in a solid form on the walls of the passageway 12. For cesium the cold block 40 may be set to a temperature of 30° centigrade and the colder block 44 may be set to a temperature of 10° C. These temperatures are selected to liquefy cesium on the wicking surface 42 adjacent the cold block 40 and to solidify cesium on the surface 42 adjacent to the cold block 44.

The cold block 40 is shown by two blocks 40 in the schematic diagram of FIG. 1 because it is a cross-sectional view. However, the cold block 40 may be a single block or multiple blocks that circumferentially surround the passageway 12 and create a tubular surface within the passageway 12 that is cooled to the liquid condensation temperature of the alkali metal in the gas. Likewise, the colder block 44 is represented by two blocks 44, but those blocks likewise may represent a single block or multiple blocks that surround the passageway 12 and create another tubular surface within the passageway, and this surface is cooled to the solidification temperature of the alkali metal vapor. Blocks 50 and 54 discussed below have similar constructions.

Disposed to the right of the colder block 44, a window 46 is provided on the right end of the passageway 12. The primary function of the window is to allow the emission of the main laser beam 25 that is propagated down the passageway 12. The combination of the heated leading edge 28, the cold block 40 and the colder block 44 will effectively protect the window 46 from contact with the alkali metal that is used in the gas flow 20. If alkali metal was allowed to reach the window 46, it would solidify the alkali metal, and the laser beam 25 would heat the metal to a temperature sufficient to decompose the hydrocarbon gas within the passageway 12. The decomposing gas would deposit carbon on the window 46 and reduce the transparency of the window, which would reduce the power and efficiency of the laser. Thus, by preventing the deposit of alkali metal on the window, the structure described above will prevent or dramatically reduce carbon deposits on the window 46 and thereby maintain the performance of the laser. Also, the cold block 40 and colder block 44 will reduce the overall temperature of the passageway 12 such that the window 46 is maintained at or about room temperature.

Referring to the left side of the laser propagation passageway 12, it is also provided with a cold block 50 and a colder block 54 which correspond to the blocks 40 and 44 previously described. Likewise, a heated leading edge 26 is provided on the left side of the laser propagation passageway 12 and it performs the same function as the heated leading edge 28. As described before, the cold block 50 will cause alkali metal to liquefy on a wicking surface 52, and the metal will be transported along the wicking surface to the heated leading edge 26 where it will be re-vaporized. A mirror 56 or window 56 is provided on the left end of the passageway 12 and it is protected by the heated leading edge 26, the cold block 50 and the colder block 54. Thus, carbon deposits are avoided on the window 56 as well, and the window 56 is maintained at or about room temperature.

Figure 2:
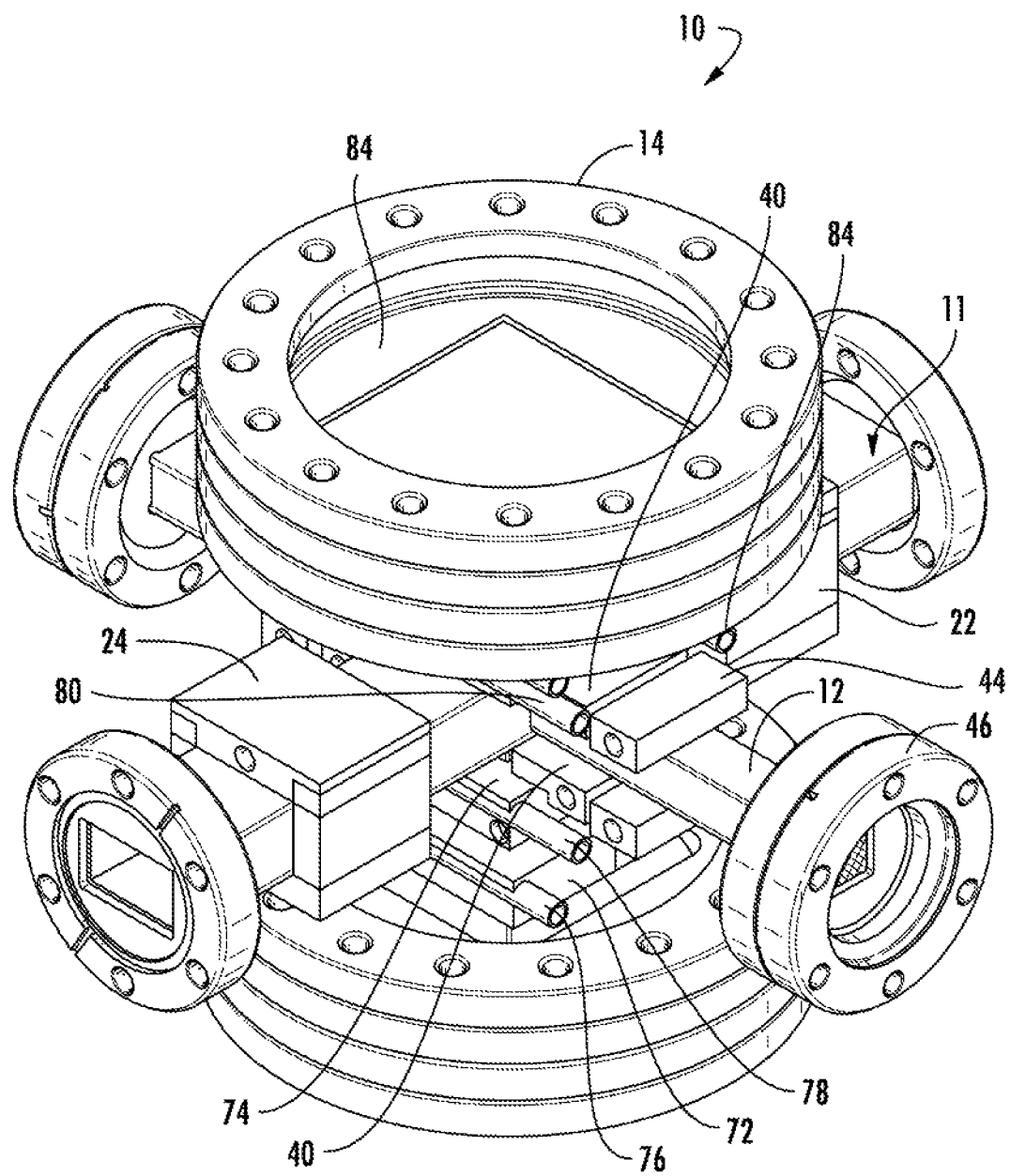
FIG. 2 is a diagrammatic three-dimensional view of the laser shown in FIG. 1.

Referring now to FIG. 2, there is shown another somewhat diagrammatic three-dimensional view of the laser 10 shown in FIG. 1. The gas passageway 11 is shown extending into the page from left to right, and the laser propagation passageway 12 is shown extending into the page from right to left. The laser pump passageway 14 is shown as being vertical. In this view, the laser blocks 22 and 24 are shown in an exploded position disconnected from any power source. By exploded, it is meant that the heater blocks 22 and 24 are shifted outwardly on the gas passageway 11 so that they are more visible. In actuality, they would be positioned as close as possible to the laser propagation passageway 12 as shown in Figure one. The blocks 24 and 22 may wrap completely around the gas passageway 11, and if desired may also wrap around the leading edge 26 (FIG. 1) of the laser propagation passageway 12.

The cold block 40 and the colder block 44 are shown cut apart and partially removed to increase their visibility. Both the cold block 40 and the colder block 44 may wrap entirely around the passageway 12. In this view, cooling blocks 72 and 74 are also visible and are also cut away and partially removed. These blocks 72 and 74 are provided on the laser pump passageway 14 and cool the incoming pump laser. The blocks 72 and 74 are cooled by refrigeration tubes 76 and 78 (shown cut away and partially removed) and they circulate a liquid or a gas suitable for cooling the blocks 72 and 74 to a desired temperature. Likewise, tubes 80 and 84 (shown cut away and partially removed) cool blocks 40 and 44 to desired temperatures as described before.

While solid cooling and heating blocks are shown, the blocks may have different constructions. For example, blocks 40 and 44 and blocks 50 and 54 (FIG. 1) may be jackets and liquid or gas may be exposed to the walls of passageway 12 within the jackets to maximize heat transfer. Likewise, heater blocks 22 and 24 may be solid blocks, or jackets for containing liquid or gas, or may be an electric powered heater, such as an electrical resistance heated block.

The laser propagation passageway 12 may be a variety of shapes and sizes, but in this example, it is rectangular and has a dimension of approximately 18 mm by 18 mm. The width dimension of the blocks 40, 44, 50 and 54 lies in a direction parallel to the longitudinal dimension of the laser propagation passageway 12. Ideally the width dimensions of the blocks 40, 44, 50 and 54 would be substantially greater than 18 mm, the width of the passageway 12. However, it has been discovered that blocks having width dimensions that are less than 18 mm will work well. Specifically, blocks 40, 44, 50 and 54 may have dimensions of approximately 12 mm to 25 mm. The convective flow 30 and 32 created by the flowing gas 20 is substantial, but it has the advantage of flowing the alkali metal vapor over the blocks 40, 44, 50 and 54 quite efficiently and assuring that the alkali metal is deposited on the blocks and removed from the passageway 12.

The effectiveness of the blocks 40, 44, 50 and 54 is illustrated by the difficulty or impossibility of operating this laser without the blocks. Specifically, if the blocks 40, 44, 50 and 54 are turned off, meaning they are not cooled, the metal vapor that enters the passageway 12 and is pumped down the passageway by the convective flows 30 and 32 is sufficient to prevent the laser beam 25 from being established. In other words, the laser will not turn on. The metal vapor within the passageway 12 is sufficient to absorb light and prevent the laser from turning on. The convective flows 30 and 32 are an advantage as long as the blocks 40, 44, 50 and 54 are cooled to the correct temperature, but the convective flows 30 and 32 are difficult impediments to the operation of the laser absent the blocks 40, 44, 50 and 54.

In the embodiment shown in FIGS. 1 and 2, the thickness of the heater blocks 22 and 24 is approximately one quarter of an inch, and the colder blocks 40 and 50 are spaced just apart from the heater blocks 22 and 24. In this configuration the spaces adjacent to the leading edges 26 and 28 are dead spaces and will contain circulating metal vapor. However, to some extent the pump laser 14 is diffused, retracted or reflected into the dead space and at least partially bleaches the dead space and permits the laser to easily turn on. During operation, the dead space is completely bleached by the laser beam 25, but the dead space adjacent the heaters and leading edges 26 and 28 will cause a slight reduction in the efficiency of the laser because this area will absorb light. Thus, the size of the dead spaces should be limited to a longitudinal distance that will allow the laser to easily turn on despite the absorption found in the dead spaces. While the dead spaces are an advantage because they re-vaporize the alkali metals and can effectively pump the metal vapor back into the gas flow 20, the dead spaces are also a slight disadvantage because they absorb light and very slightly reduce the efficiency of the laser 25 in the laser propagation passageway 12. However, this slight inefficiency is considered inconsequential as compared to the beneficial effect of the dead spaces adjacent the leading edges 26 and 28.

Referring again to FIG. 1, the wicking surface 52 and 42 may be a wire mesh disposed immediately adjacent to the interior of the passageway 12, or the wicking surfaces may be a roughened surface on the interior of the passageway 12. Other wicking surfaces would also be suitable.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A laser comprising:
a plurality of passageways forming a six-way cross intersecting at a main cell, the passageways including:
   a. a gas passageway including a wall for containing and transporting a flow of gas, the gas including an alkali metal vapor and including a buffer gas;
   b. a laser propagation passageway intersecting the gas passageway at the main cell;
   c. a pump passageway including a pump source for producing a pump laser that is directed into the main cell and produces a laser beam in the laser propagation passageway;
at least one heat source for heating the walls of the gas passageway to a temperature sufficient to vaporize the alkali metal in the gas and being disposed near the laser propagation passageway so that the heat source heats the leading edges of the laser propagation passageway on either side of the main cell to a temperature sufficient to vaporize the alkali metal;
a convective gas flow being formed in the laser propagation passageway induced by the flow of gas in the gas passageway, the convective gas flow being disposed to flow into the leading edges of the laser propagation passageway, such that at least some of the alkali metal in the convective gas flow is heated to the vaporization temperature of the alkali metal by the heat of the leading edges and wherein the convective gas flow returns the vaporized alkali metal to the gas passageway and the main cell;
at least one window disposed in the laser propagation passageway;
at least one cold block being disposed to cool the wall of the gas passageway to produce a cold wall region between the window and at least one of the leading edges, the cold wall region being cooled to a temperature that is sufficiently cold to condense alkali metal vapor in the gas to produce a liquid alkali metal on the cold wall region, the cold wall region being configured to wick the liquid alkali metal to the leading edge where the liquid alkali metal is vaporized and at least some of the vaporized alkali metal is reintroduced into the gas in the main cell; and
at least one colder block being disposed to cool the wall of the gas passageway to produce a colder wall region between the window and the cold wall region, the colder wall region being cooled to a temperature that is sufficiently cold to solidify the alkali metal vapor in the gas and to capture the alkali metal in a solid form on the colder wall region; whereby the window is protected from the alkali metal in the gas by the removal of the alkali metal from the gas by the cold wall region and the colder wall region.

2. The laser of claim 1 wherein the cold block and the colder block are configured to protect the window from heat within the laser propagation passageway and maintain the window at room temperature.

3. The laser of claim 1 wherein the windows are selected from a group consisting of a window having an anti-reflective coating and a window mounted at Brewster's angle.

* * * * *